(12) United States Patent
Rezai

(10) Patent No.: US 7,344,109 B1
(45) Date of Patent: Mar. 18, 2008

(54) SYSTEM AND METHOD FOR INTEGRATING AIR AND GROUND TRANSPORTATION OF PASSENGERS AND CARGO

(76) Inventor: Soheil Rezai, 540 Avignon Ct., Atlanta, GA (US) 30350-1068

(*) Notice: Subject to any disclaimer, the term of this patent is extended or adjusted under 35 U.S.C. 154(b) by 193 days.

(21) Appl. No.: 10/899,350

(22) Filed: Jul. 26, 2004

(51) Int. Cl.
*B64D 47/00* (2006.01)

(52) U.S. Cl. .................. 244/118.2; 244/118.6

(58) Field of Classification Search ............ None
See application file for complete search history.

(56) References Cited

U.S. PATENT DOCUMENTS

| | | | |
|---|---|---|---|
| 2,388,380 A | 11/1945 | Bathurst | |
| 2,697,569 A | 12/1954 | Westcott | |
| 3,419,164 A * | 12/1968 | O'Neill | 414/345 |
| 4,218,034 A | 8/1980 | Magill | |
| 4,379,533 A | 4/1983 | Caldwell | |
| 6,102,332 A | 8/2000 | Haxton | |
| 6,494,404 B1 | 12/2002 | Meyer | |
| 2005/0247824 A1 * | 11/2005 | Allison, Sr. | 244/137.2 |

OTHER PUBLICATIONS

Paul Rincon, "Future Flight: The Shape of Things toCome", BBC News Online, Dec. 12, 2003, 3 pages.

Defence Systems Daily, "Boeing Projects $4.7 trillion market for new aircraft and services", Defence-data.com, Jun. 20, 2001, 2 pages.

Sylvia Adcock, "Up, Up and Away", Future.Newsday.com, 1999, 4 pages.

Michael Mecham, "7E7 Go-ahead reassertsBoeing's heritage", Aviation Week & Space Technology, Dec. 21, 2003, 5 pages.

Jane L. Levere, "Business Travel; Inventors Offer Ideas for a Second Century of Travel", New York Times, Apr. 20, 2004, 3 pages.

* cited by examiner

*Primary Examiner*—Timothy D. Collins

(57) ABSTRACT

A system and method for integrating air and ground transportation of passengers and cargo. The system comprises a plurality of universal passenger containers. The system further comprises a plurality of universal cargo containers. An airplane is provided with a hollow fuselage adapted to be loaded with a plurality of passenger and/or cargo containers. A flatbed trailer can be provided to carry a passenger or a cargo container. A tractor vehicle can be provided to transport flatbed trailers between airplanes, locations within the airport, and points of origin and destination outside the airport complex. A system can be provided to load and unload passenger and cargo containers into and out of airplanes at the airport. A system is provided comprised of an airport complex including take-off and landing runways, taxiways, airplane staging areas, apparatus for detection of weapons in passenger and cargo containers, and air terminals with arrival and departure gates and baggage handling conveyors. A system is also provided comprised of remote air terminals at strategic locations a distance from the airport complex.

32 Claims, 11 Drawing Sheets

FIG. 8
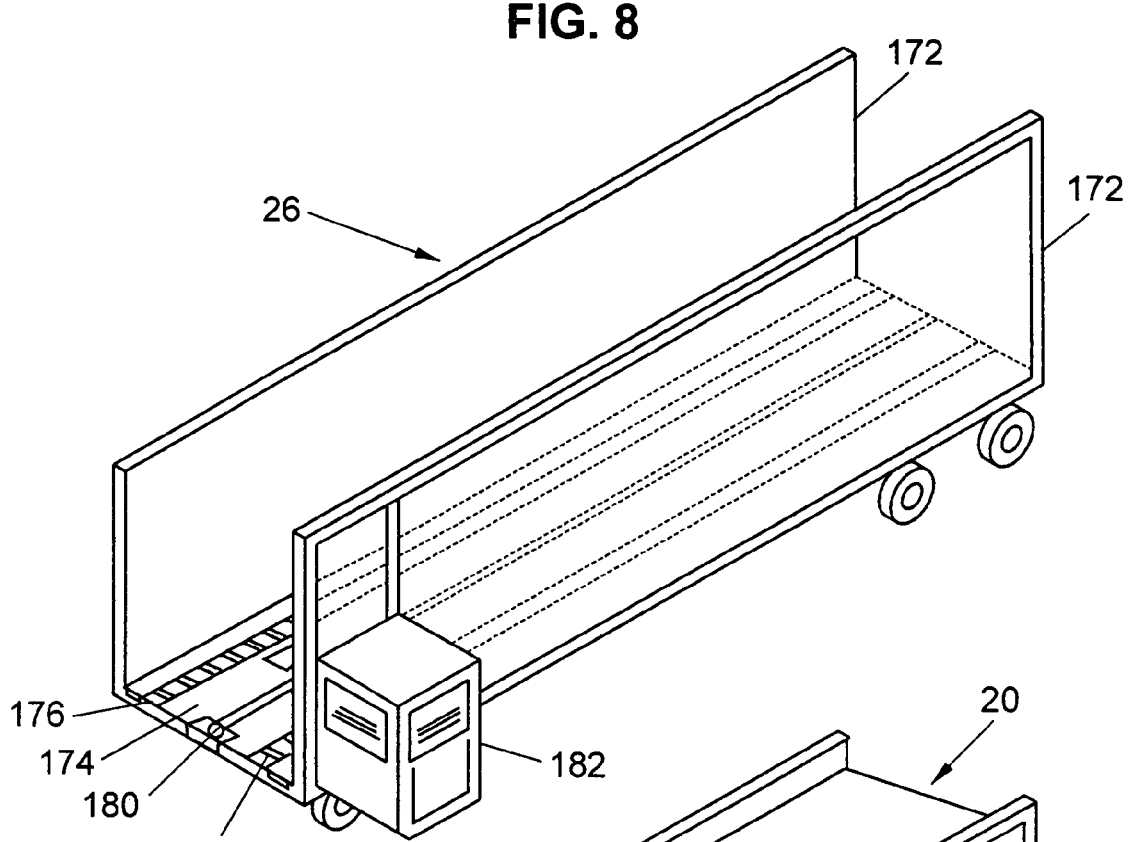
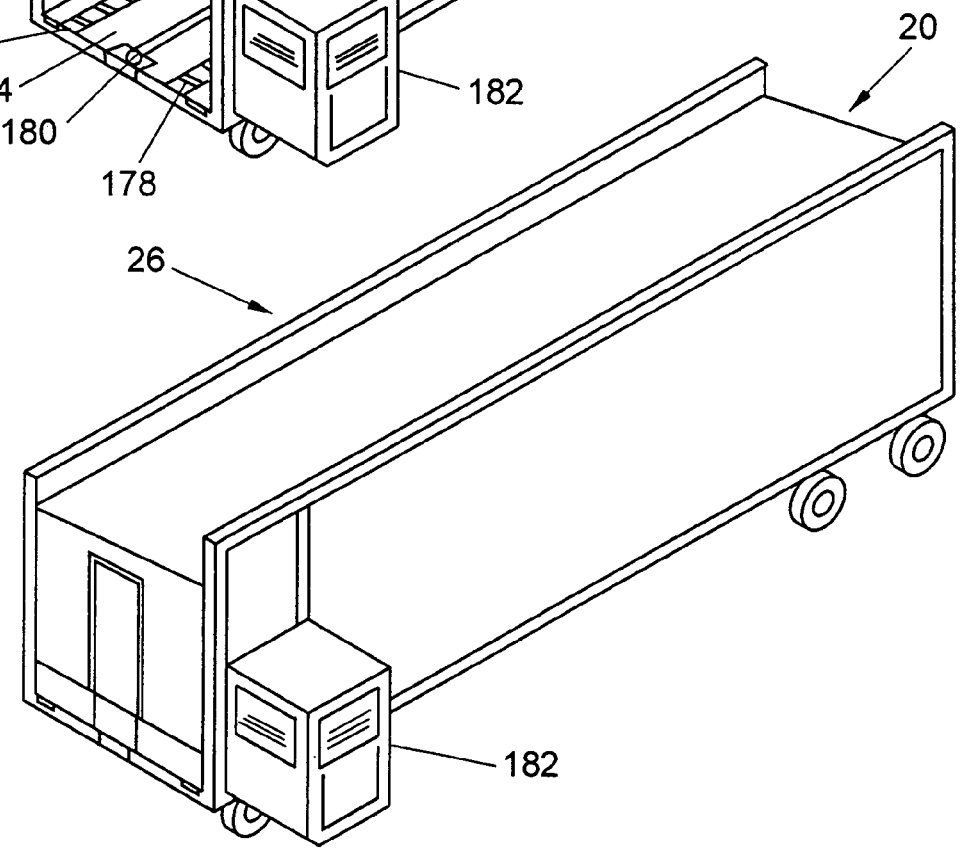
FIG. 9

FIG. 10
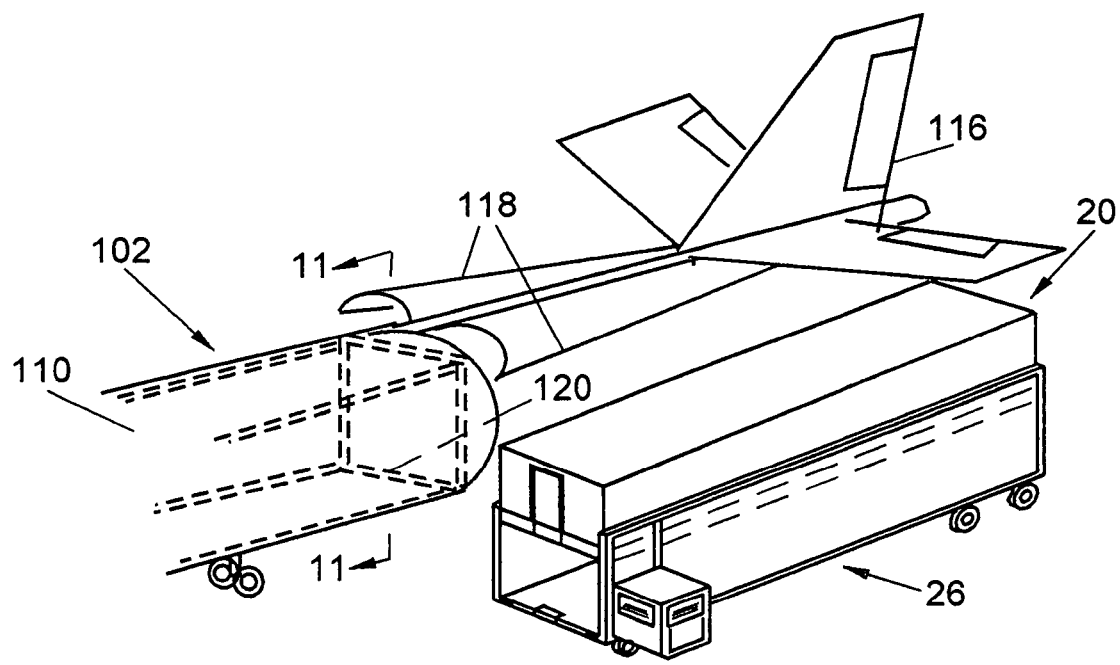
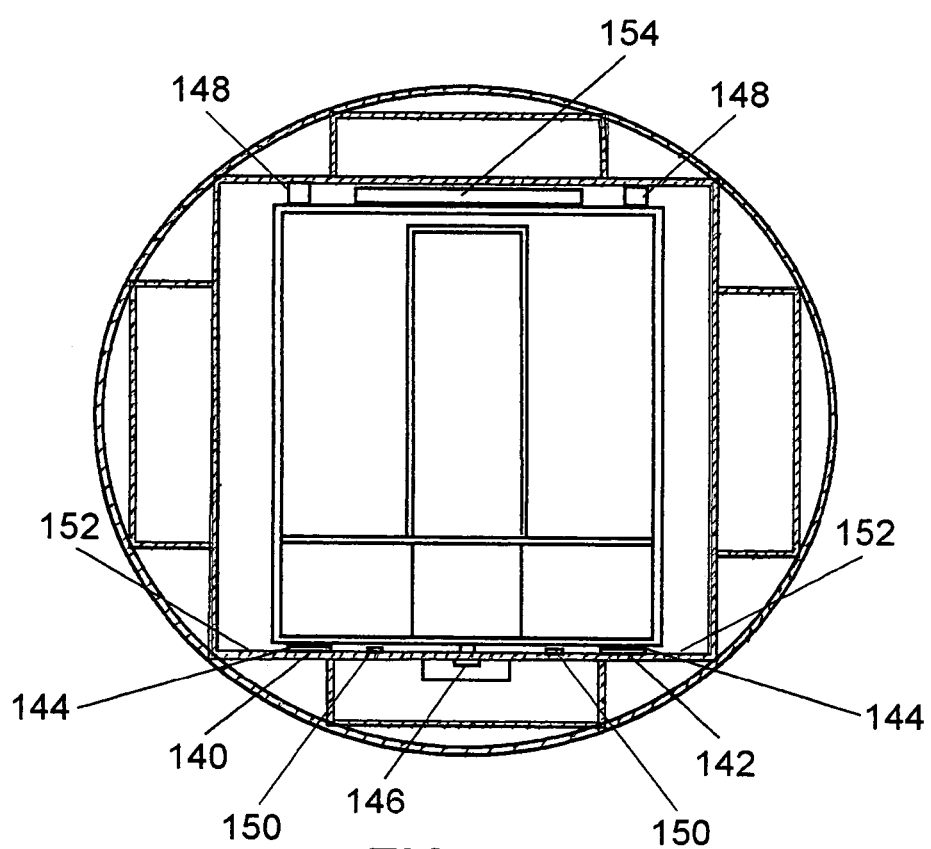
FIG. 11

FIG. 12
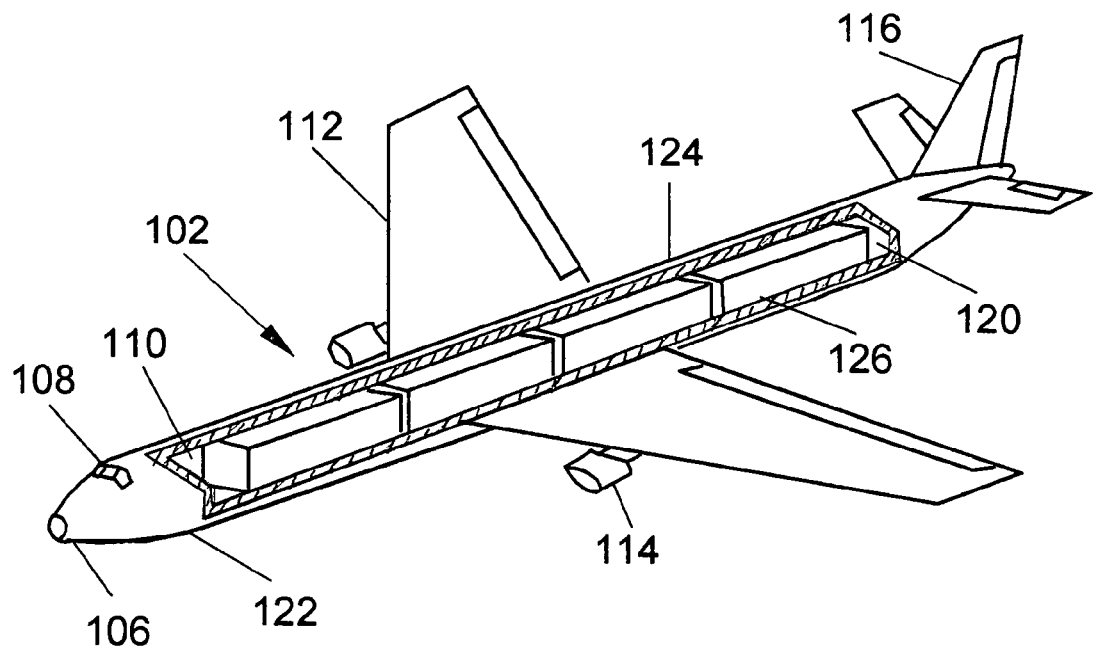
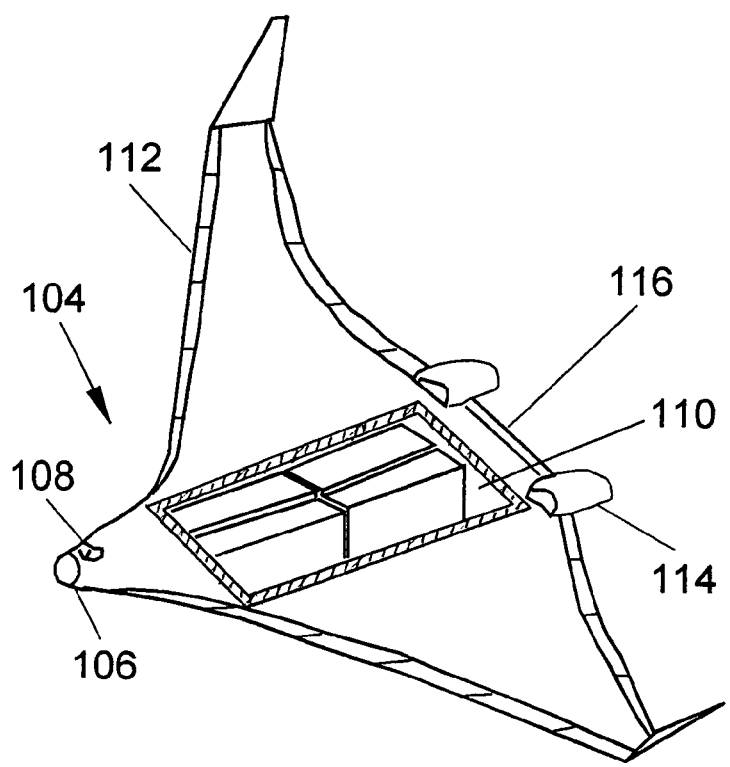
FIG. 13

SYSTEM AND METHOD FOR INTEGRATING AIR AND GROUND TRANSPORTATION OF PASSENGERS AND CARGO

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

This invention relates to air transportation of passengers and cargo, and more specifically, it pertains to a novel, efficient, and integrated system and method for transporting passengers and cargo by air between airports, and points of origin and destination on the ground.

Commercial air travel is riddled with inefficiencies, delays, escalating costs, and safety and security concerns. Airline bankruptcies are at an all time high and air traveler satisfaction is at an all time low. Air terminal and runway bottlenecks coupled with traffic congestion are overwhelming air carriers and airports worldwide. One of the major challenges facing the industry is the finite number and limited capacity of airports in and around major metropolitan areas where most air travel originates and terminates. In the midst of urban sprawl, airports require thousands of acres of contiguous land for runways, taxiways, concourses and gates. They also need easy access to ground transportation. As airports move further from major population centers, travel to and from the airport takes longer and increases the cost and duration of the overall trip. Increasingly, traffic congestion outside the airport and long lines for check-in and security inside the airport combined with chronic flight delays make air travel an undesirable form of transportation.

Air carriers face a number of major issues including: excessive airplane idle time during turnaround at the gate, time and safety concerns related to taxiing to and from the gate, complicated logistics of loading and unloading high capacity airplanes, passenger and cargo security, lost and damaged baggage and costly baggage handling systems, and wide variations and often dichotomous demands for passenger and cargo transportation. Additionally, tragic terrorist events in recent years have revealed that current security measures are woefully inadequate and the industry is quite vulnerable to future terrorist attacks.

The commercial air transportation industry is very inflexible in sharing resources. It has limited capability to support military air transportation needs. In the event of war or national emergencies, the industry is ill equipped to quickly convert its fleet of passenger airplanes to transport large numbers of personnel and materiel by air. As a result, the military builds up separate capacity to meet its sporadic emergency air transportation needs.

Worldwide demand for transportation of passengers and cargo by air is growing exponentially thus compounding the problems and challenges facing the industry. As demand for affordable air transportation escalates, population growth coupled with increases in tourism, business travel, and global trade further stretch the over-extended system. Currently, commercial air carriers operate approximately 15,000 passenger jets and carry over 1.8 billion passengers each year. By 2020, the number of commercial passenger jets worldwide is projected to exceed 33,000, and the number of passengers is expected to more than double.

The design and functionality of airplanes in its present format has reached a plateau. The number of manufacturers of commercial jets has dwindled to two, namely Boeing and Airbus. During the past three decades the industry has made only minor advancements. Airplane innovations in recent years include only incremental gains in operating efficiency due to the use of lighter materials and more fuel-efficient engines. Speed and passenger capacity have reached a practicable limit. Boeing's largest airplane, the 747, was introduced in 1970. It carries 400 to 525 passengers depending on the mix of economy and premium-class seats. Boeing's new 7E7 Dreamliner will carry 200 to 300 passengers and offers 15%-20% greater fuel efficiency over older models. Airbus' new A380 will carry 550 to 800 passengers depending on the model. But in order to accommodate the A380, each airport will have to spend over a billion dollars to modify runways, taxiways, concourses and gates.

The air transportation industry is in dire need of a revolutionary approach to help it eliminate current problems, lower the overall cost of operations, improve safety and security, and meet future demands.

Since the invention of the airplane a century ago, countless designs addressing various aspects of air transportation have been developed. During the past thirty years despite the crowded prior art, very little has changed in the system and method for passenger and cargo transportation by air between airports, and points of origin and destination on the ground. Although known methods and apparatus of prior art fulfill their respective goals and objectives, they do not present a novel and efficient solution for integrating air and ground transportation of passengers and cargo.

It is known in the prior art to insert passenger or cargo pods into the hollow fuselage of airplanes or to attach said pods to airframes and fly said airplanes from a departure airport to a destination airport. The following typifies the closest known prior art as it relates to the present invention.

As early as 1945, airplane design pioneers envisioned airplanes having one or more removable cargo compartments or sections. U.S. Pat. No. 2,388,380, Bathurst, et al. and U.S. Pat. No. 2,697,569, Westcott, describe an airplane skeleton frame in which the fuselage is formed of removable sections.

In U.S. Pat. No. 4,379,533, Caldwell, et al. disclose a transport airplane consisting of a basic structure containing the cockpit, wings, engines, empennage, and an open, flat section connecting the cockpit and empennage portions. The payload forms the fuselage shape and may be comprised of a passenger pod, cargo container, or vehicular equipment.

In U.S. Pat. No. 6,102,332, Hexton, et al. envision a method of transporting large numbers of passengers by air from a departure airfield to a destination airfield by attaching a plurality of cylindrical passenger pods to the underside of a large flying-wing airframe.

Another example of a passenger airplane container system is given in Meyer, U.S. Pat. No. 6,494,404, which describes allowing a passenger airplane to be loaded and unloaded in a safe and efficient manner. In the very broadest sense, Meyer envisions a stacking structure with a plurality of horizontal or vertical loading chutes to raise and lower a cylindrical passenger pod between the horizontal bays and the airplane parking zone. Loading passengers into a container within the stacking structure, transporting the container down a chute and loading it into the airplane addresses the current issue of parking an airplane at the gate for extended periods. However, it creates additional handling issues within the stacking structure without addressing transportation between the airport and points of origin and destination on the ground.

In U.S. Pat. No. 4,218,034, Magill envisions an airport complex comprising a multi-level passenger terminal and a cargo building in close proximity. They are interconnected by a towline cargo-handling system cooperating with a series of power-driven cargo conveyors.

While the aforementioned patents fulfill their respective, particular goals and expectations, taken either singly or in combination they are not seen to describe a system and method that integrates air and ground transportation of universal containers carrying passengers and cargo efficiently and safely by air between airports, and points of origin and destination on the ground. Thus, the system and method for integrating air and ground transportation of universal containers carrying passengers and cargo as disclosed by the present invention substantially differs from the prior art.

Airport congestion, escalating operating costs, operating inefficiencies, and safety and security issues, coupled with rising demand for air transportation have created the need for a new and improved system and method that integrates air and ground transportation of passengers and cargo. The present invention substantially addresses these issues and fulfills this need.

It is a principal object of the present invention to provide a system and method for integrating the transportation of passenger and cargo containers by air between airports, and points of origin and destination on the ground. Accordingly, the object is to improve efficiency, lower overall cost, reduce transit time from the point of origin to the destination, and enhance safety and security.

It is another object of this invention to provide an efficient and universal system and method for transporting passenger and cargo containers on streets and highways from remotely located air terminals and other points of origin to the airport, and from the airport to remote air terminals and other destinations.

It is an additional object of this invention to provide a universal container system for transporting passengers by airplane, truck, and rail, and additionally to simplify and streamline the cleaning and servicing of passenger cabins and the handling and processing of passenger baggage during the turnaround period between unloading and loading passengers, and to reduce the workload of flight attendants by providing an automated system for delivering and retrieving food trays and beverages to and from passengers.

It is also an object of this invention to provide a universal container system for transporting cargo by airplane, truck, and rail, and to improve efficiency by enabling shippers to load their cargo at the point of origin and recipients to unload their cargo at the destination.

It is a further object of this invention to provide an airplane with a hollow fuselage, and the capacity and flexibility to transport a plurality of removable universal passenger and/or cargo containers in its fuselage from a departure airport to a destination airport.

It is another object of this invention to provide an efficient system and method for rapidly and safely loading and unloading universal passenger and cargo containers into and out of transport airplanes, minimizing airplane turnaround time.

It is also an object of this invention to provide a system and method for an efficient airport with a plurality of passenger air terminals, take-off and landing runways, and flexible staging areas to load and unload passenger and cargo containers into and out of transport airplanes.

It is a further object of this invention to provide a system and method for a plurality of remote passenger air terminals, strategically located outside the airport throughout adjoining metropolitan area(s) for convenient access by travelers.

It is an additional object of this invention to increase the capacity of conventional airports by providing a system and method for processing passenger containers instead of passenger jets at the gates of air terminals, thus requiring substantially less space for maneuvering and parking at the gates.

It is another object of this invention to improve security by scanning containers for weapons including explosives and radiological and bio-chemical agents, and by restricting access from the passenger containers to the cockpit, and further by ensuring that passenger baggage travels in the same container with its owner, and to improve passenger safety by providing a parachute system for containers to safely descend to the ground in case of a mid-air mishap.

It is a further object of this invention to improve safety and efficiency and reduce fuel consumption by eliminating the need for airplanes to taxi to and from terminal gates, and for aircraft tugs to transport airplanes.

It is an additional object of this invention to provide significant and suitable air transportation capacity for transporting military personnel and materiel in the event of war or national emergency, and to enable airplanes to transport fluids for fighting forest fires, refueling military aircraft in mid-air, and other applications.

Still further objects and advantages of this invention will become apparent from a consideration of the ensuing description and drawings.

BRIEF SUMMARY OF THE INVENTION

Air transportation industry experts predict that unless drastic improvements are made, within the next few years the system will be neither safe nor functional. Conventional methods known in the prior art offer no realistic solutions and create new issues and challenges. The present invention transforms the entire air transportation system. It is a novel and efficient system and method for integrating air and ground transportation of passengers and cargo and mitigating the issues and challenges facing the industry.

The present invention essentially comprises a plurality of passenger containers and cargo containers with universal configuration and dimensions; airplanes with hollow fuselage to hold and transport passenger and/or cargo containers; lift vehicles to load and unload containers into and out of airplanes; flatbed trailers enabling containers to be towed while on the ground; tractor trucks towing flatbed trailers; air terminals with arrival and departure gates for loading and unloading passengers and their baggage into and out of passenger containers; and airports with take-off and landing runways, staging areas to refuel and service airplanes and to load and unload containers into and out of airplanes, and facilities to scan containers for weapons.

In summary, a passenger travels to a remote air terminal or to the terminal at the airport and goes through ticketing, baggage check-in, and security the usual way. The passenger then proceeds to a designated departure gate to board a designated passenger container. The passenger container provides all the usual amenities currently found inside a conventional airplane cabin, including lights, air conditioning, food and beverage carts, lavatories, audio, video and computer feeds. After passenger boarding is completed, container doors are closed and the container is processed through weapons detection facilities on the way to the airplane staging area at the airport. The container is loaded into the hollow fuselage of the airplane where it is securely locked into place and its utility connections are hooked up to the airplane's feed lines.

The airplane loaded with containers drives off the staging area and takes off from the departure airport and flies to a destination airport. In case of a mid-air mishap during flight, containers are ejected out of the airplane as their parachutes are deployed. After landing, the airplane taxis to the staging area where it is refueled and serviced while the containers inside the airplane are unloaded. Depending on their final destinations, passenger containers are either transported to another airplane, to an arrival gate at the airport terminal, or to an arrival gate at a remote air terminal. After the passenger container is parked at the gate, passengers disembark while the ground crew unloads their baggage from baggage compartments within the container. Baggage is conveyed to the baggage claim conveyor inside the gate area. Passengers claim their baggage and either proceed to another gate for a connecting flight, or to the parking garage or public transportation. Meanwhile, arriving passenger containers are cleaned and serviced and food and beverage carts are replenished, preparing the container for boarding new passengers.

Shippers load their cargo into cargo containers at the point of origin. Loaded containers are transported to the airport where they are processed through weapons detection facilities and placed inside departing airplanes. Depending on capacity and schedule, passenger and cargo containers can be placed inside the same airplane, maximizing the airplane's utilization. At the destination airport, cargo containers are taken out of the airplane and transported to their final destinations where recipients unload their cargo.

The present invention is not limited in its application to the system and method described herewith. The invention in its totality is capable of other embodiments and can be implemented in various ways. Accordingly, the present invention provides a truly unique, efficient, safe, and secure system and method for integrating air and ground transportation of passengers and cargo. Features and advantages of the present invention will become more apparent in the following detailed description and accompanying drawings.

BRIEF DESCRIPTION OF THE DRAWINGS

FIG. 8 is a perspective view of the lift vehicle.

FIG. 9 is a perspective view of the lift vehicle transporting a passenger container.

FIG. 10 is a perspective view of the lift vehicle loading a passenger container into an airplane.

FIG. 11 is a rear elevational view of the airplane's opening with a container inside.

FIG. 12 is a perspective view of an airplane with partially cut-away view of containers inside.

FIG. 13 is a perspective view of a blended-wing-body airplane with partially cut-away view of containers inside.

DETAILED DESCRIPTION OF THE PREFERRED EMBODIMENT

Figure 1:
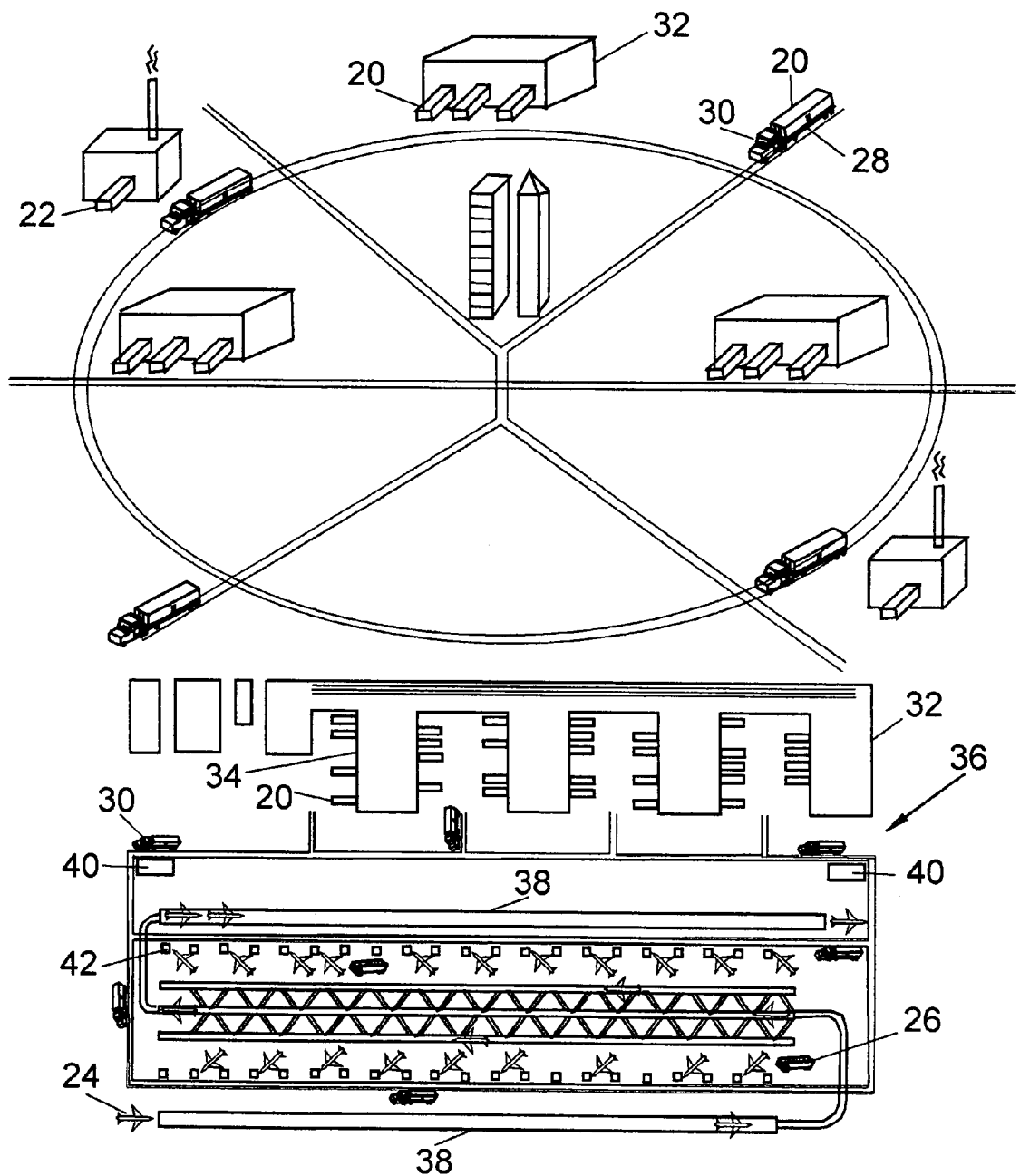
FIG. 1 shows an overview of integrated air and ground transportation of passengers and cargo in accordance with the principles of this invention.

The present invention as illustrated in FIG. 1 essentially comprises a plurality of passenger containers 20 and cargo containers 22 with universal configuration and dimensions, airplanes 24 with hollow fuselage to hold passenger and/or cargo containers, lift vehicles 26 to load and unload containers into and out of airplanes, flatbed trailers 28 enabling containers to be towed, tractor trucks 30 to tow flatbed trailers, air terminals 32 with gates 34 to load and unload passengers and their baggage into and out of passenger containers, and airports 36 with take-off and landing runways 38, weapons detection facilities 40 to scan containers, and airplane staging areas 42 to refuel and to load and unload containers into and out of airplanes.

Figure 2:
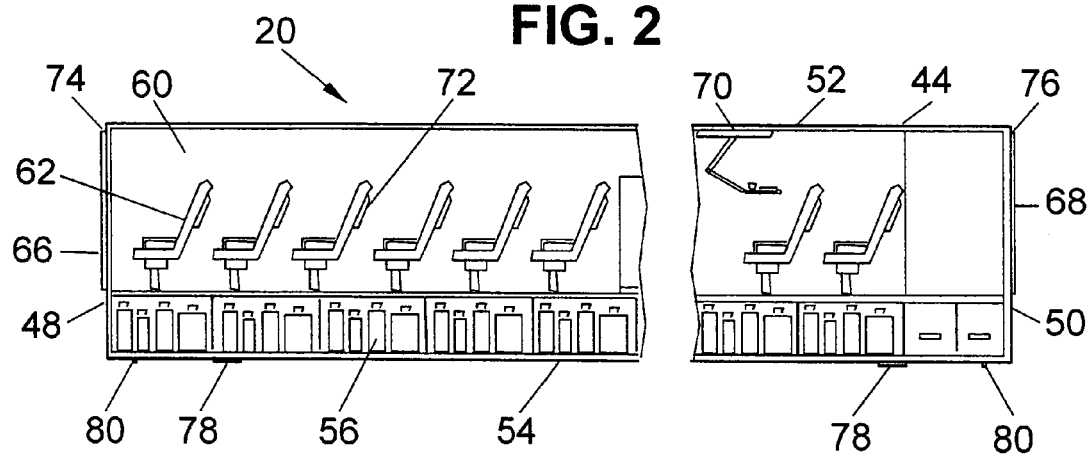
FIG. 2 is a side elevational view of the passenger container.
Figure 3:
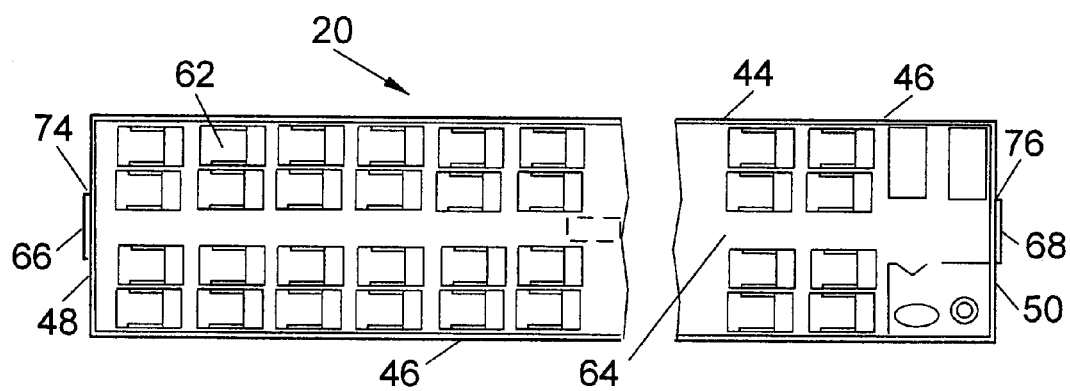
FIG. 3 is a top plan view of the passenger container.
Figure 4:
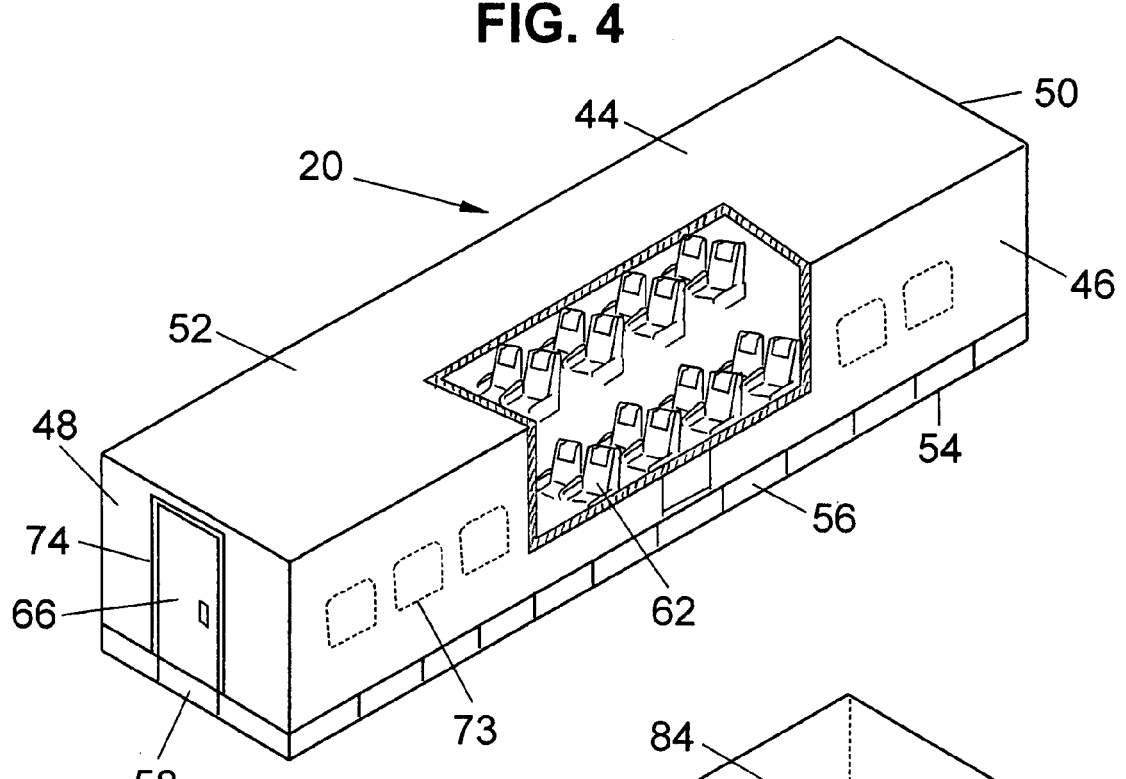
FIG. 4 is a perspective view of the passenger container.

The passenger container (FIGS. 2, 3, 4) is constructed of a rigid metallic material. It has a rigid metallic exterior 44 that envelops the container and its passengers. The container is comprised of two sides 46, a front 48, a rear 50, a top 52, and a bottom 54 surface. The container has no windows; however, containers with windows on both sides could be provided. The interior of the container has two levels. The bottom level is accessible from the outside on both sides of the container and contains a plurality of baggage compartments 56. A utility chamber 58 runs longitudinally along the center of the bottom level and contains air conditioning ducts, oxygen lines, water lines, power, audio, video and computer lines, and connections pertinent to the operation of the container. The top level 60 of the container is the passenger cabin with a plurality of rows of seats 62 and a center aisle 64. The center aisle runs from the front door 66 centrally located at the front of the container to the rear door 68 centrally located at the rear of the container. A flat robotic mechanism 70 with retractable folding arms is attached to the ceiling of the passenger cabin and travels longitudinally above the aisle delivering and retrieving food trays and beverages to and from passengers. The back of each passenger seat is equipped with a flat-panel video display 72. Interior walls can include virtual windows 73 wherein flat-panel video displays simulate the shape and function of typical airplane windows. Front and rear doors are equipped with sealable air lock mechanisms that enable the cabin to become pressurized during flight. Outside the container, the front and rear doors are equipped with male 74 and female 76 coupling mechanisms, respectively. Inside the hollow fuselage of the airplane, the front door of the first passenger container is coupled and sealed with the access door to the cockpit. The rear door of the passenger container is coupled and sealed with the front door of the next passenger container. The overall outside dimensions of passenger containers are within maximum dimensions allowable on streets and highways in the United States and most industrialized countries. Each passenger container is mounted on top of a flatbed trailer at all times except when it is being loaded and unloaded into an airplane and when it is inside the airplane. The underside of the container is equipped with a locking apparatus 78 to securely attach it to the flatbed trailer or to the airplane. The underside of the container is also equipped with a pair of rigid metallic protrusions 80. The protrusions are uniformly shaped and equally distanced from the front and rear of the container.

Figure 5:
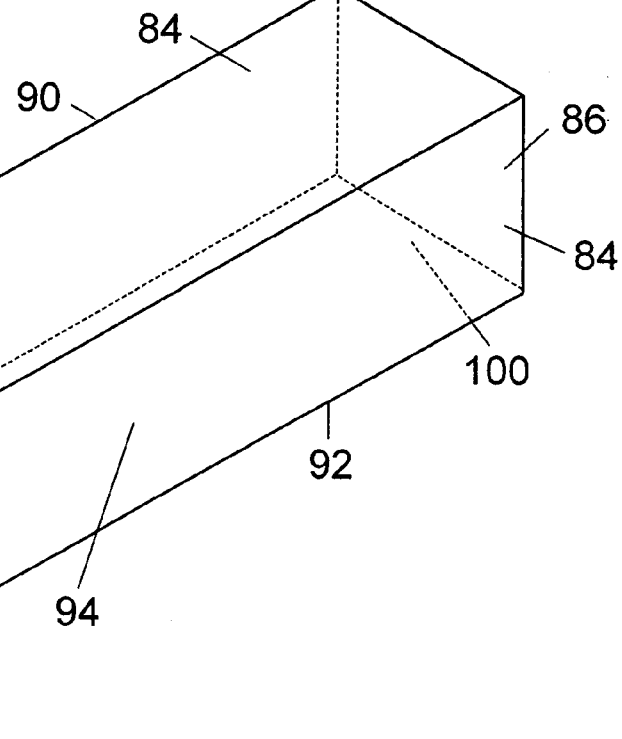
FIG. 5 is a perspective view of the cargo container.

The cargo container (FIG. 5) is constructed of a rigid metallic material. It has a rigid metallic exterior 82 that envelops the container and securely contains the cargo. The container is comprised of two sides 84, a front 86, a rear 88, a top 90, and a bottom 92 surface. The interior of the container 94 is comprised of a clear hollow section. The container is equipped with a large door 96 at the rear, which enables loaders to place cargo inside the container by hand, conveyor, or pallet truck. It could also have doors on the front or on the sides. Overall outside dimensions of the cargo container are the same as the passenger container and within maximum dimensions allowable on streets and highways in the United States and most industrialized countries. Each cargo container is mounted on top of a flatbed trailer at all times except when it is being loaded and unloaded into an airplane and when it is inside the airplane. Similar to the passenger container, the underside of the cargo container is equipped with a locking apparatus 98 to securely attach it to the flatbed trailer or to the airplane. The underside of the container is also equipped with a pair of rigid metallic protrusions 100. The protrusions are uniformly shaped and equally distanced from the front and rear of the container. Cargo containers could be provided at incremental lengths such as ½ and/or ¼ the length of universal containers.

The present invention comprises a plurality of airplanes (FIGS. 10, 11, 12) with hollow fuselage for transporting passenger and/or cargo containers. The system works with various airplane configurations including the conventional "swept-wing" 102, or blended-wing-body "BWB" (FIG. 13) 104. The airplane has a nose section 106, cockpit 108, a hollow fuselage 110, wings 112, engines 114, and tail section 116. The rear of the airplane is equipped with a pair of gull-wing doors 118 hinged at the top. In the open position the doors provide a container insertion point 120 near the tail section for loading and unloading passenger and/or cargo containers. The insertion point could also be at the front 122, the top 124, or on the side 126 of the airplane. The structure of the hollow fuselage (FIG. 11) is constructed of a rigid material and is roughly the shape of the passenger and cargo containers. Running longitudinally along the left side 140 and the right side 142 floor of the fuselage is a pair of channels. Inside each channel is a series of rollers 144 to facilitate conveying the containers horizontally forward and reverse inside the fuselage. Running longitudinally from front to rear in the center on the floor of the fuselage is a powered chain track mechanism 146. The mechanism engages the protrusions on the underside of the container in order to move the container forward into the fuselage or reverse out of the fuselage. Inside the fuselage each passenger container is locked in position with the passenger container in front of it. The rigid metallic structure in the fuselage is equipped with restraining apparatus 148 to securely hold passenger and cargo containers in place during flight, take-off, and landing. Locking apparatus on the underside of containers lock in place with corresponding locking apparatus 150 on the floor of the fuselage. The hollow fuselage is equipped with a pair of narrow, emergency walkways 152 running longitudinally from front to back on both sides of the fuselage. A parachute mechanism 154 on the ceiling of the fuselage securely attaches to the top of the container during flight and deploys in case of mid-air mishap.

Figure 6:
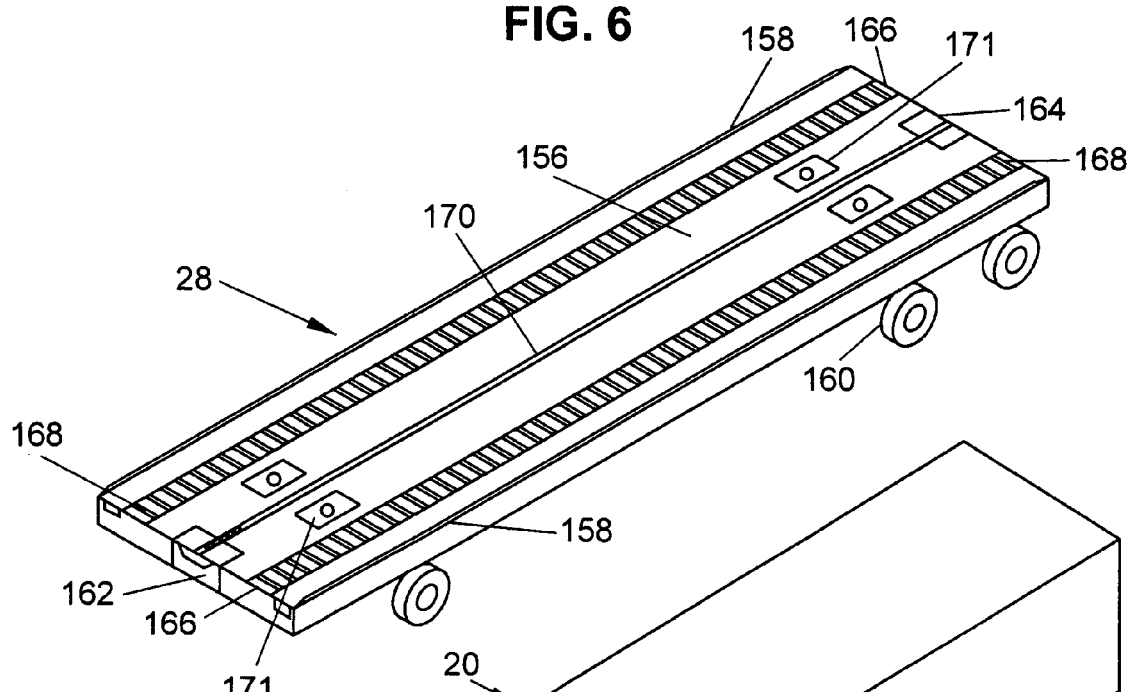
FIG. 6 is a perspective view of the flatbed trailer.

The flatbed trailer (FIG. 6) is primarily comprised of a large, flat, top surface 156 with the same dimensions as the base footprint of universal passenger and cargo containers. A passenger or cargo container is transported on top of a flatbed trailer at all times except when it is inside an airplane. A pair of rigid metallic guardrails 158 runs longitudinally along the top left and right-hand sides of the trailer. The trailer has a plurality of wheels 160. The front of the trailer is equipped with the means 162 to be towed by a tractor truck 30. The rear of the trailer is equipped with the means 164 to tow another flatbed trailer. Trailers are equipped with the required lights, license plate, braking mechanism and other operational and safety-related apparatus. Running longitudinally on the top surface of the trailer along the left and right sides is a pair of channels 166. Inside each channel is a series of rollers 168 to facilitate conveying the containers forward and reverse on the trailer. Running longitudinally from front to rear in the center on the top surface of the trailer is a conveying system comprised of a chain track mechanism 170. The mechanism engages with the protrusions 80 on the underside of the container in order to move the container forward onto the trailer or reverse off of the trailer. Locking apparatus on the underside of the container locks in place with corresponding locking apparatus 171 on top surface of the trailer.

The present invention comprises a plurality of lift vehicles (FIGS. 8, 9, 10) equipped with a lifting apparatus 172 to raise and lower containers to and from the opening at the insertion point 120 of the airplane. The lift vehicle is primarily comprised of a large flat surface 174, slightly wider than the base footprint of the container. Running on the top surface of the lift vehicle longitudinally, along the left and right sides, is a pair of channels 176. Inside each channel is a series of rollers 178 to facilitate conveying the container forward and reverse on the lift vehicle. Running longitudinally from front to rear in the center of the top surface on the lift vehicle is a conveying system comprised of a chain track mechanism 180. The mechanism engages with the protrusions on the underside of the container in order to move the container reverse onto the lift vehicle or forward off of the lift vehicle. The lift vehicle includes a driver compartment 182 and power mechanisms to lift the flat surface to the level of the airplane opening, to place the container forward into the airplane or extract it out of the airplane.

Figure 7:
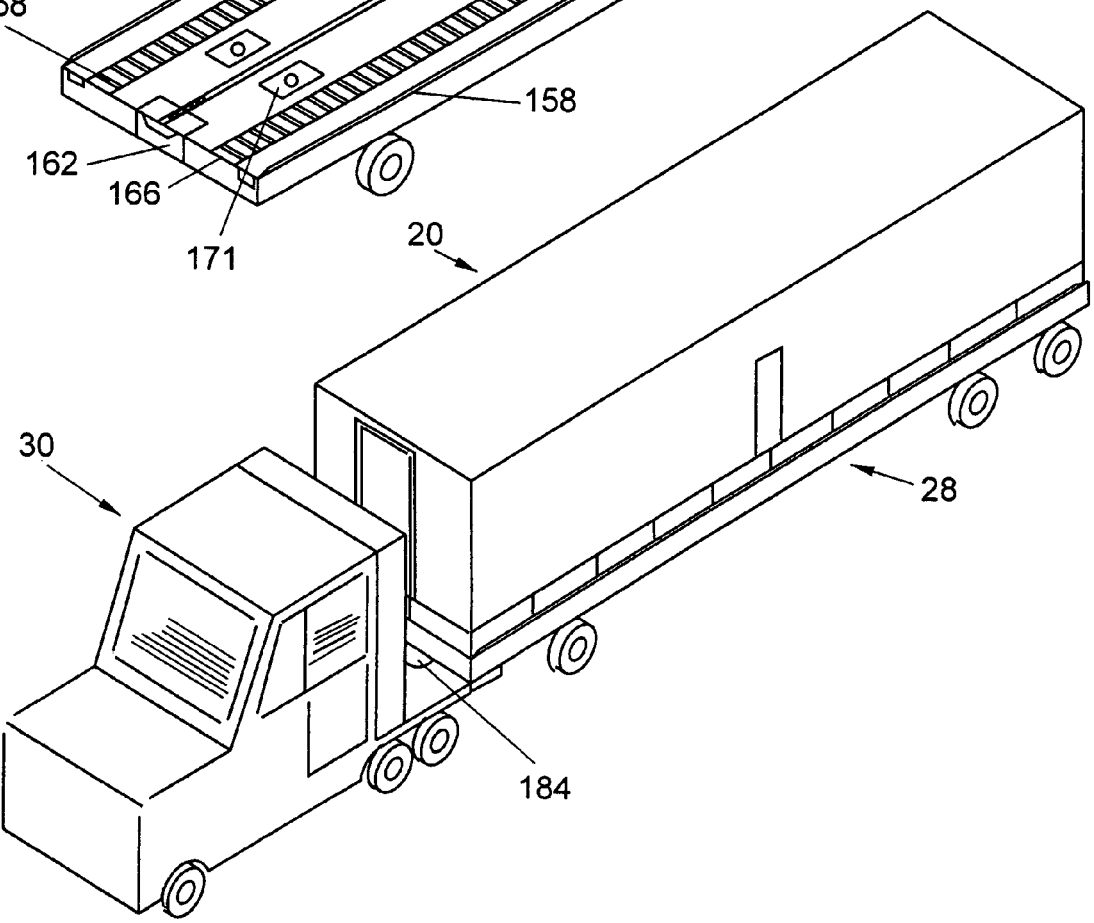
FIG. 7 is a perspective view of a tractor truck transporting a passenger container on a trailer.

The present invention comprises a plurality of tractor trucks (FIG. 7) to transport flatbed trailers 28 on the ground. Flatbed trailers are transported between airplane staging areas 42 and the airport air terminal 32, between the airport and a remote air terminal, and between the airport and points of origin and destination. Trucks can pull one or more flatbed trailers and provide power and utilities including lights, air conditioning, audio, video and computer feeds, and other amenities to the passenger containers. The rear of each tractor truck is equipped with a hitching mechanism 184 to connect to a trailer and make all the necessary utility hookups between the two.

Figure 14:
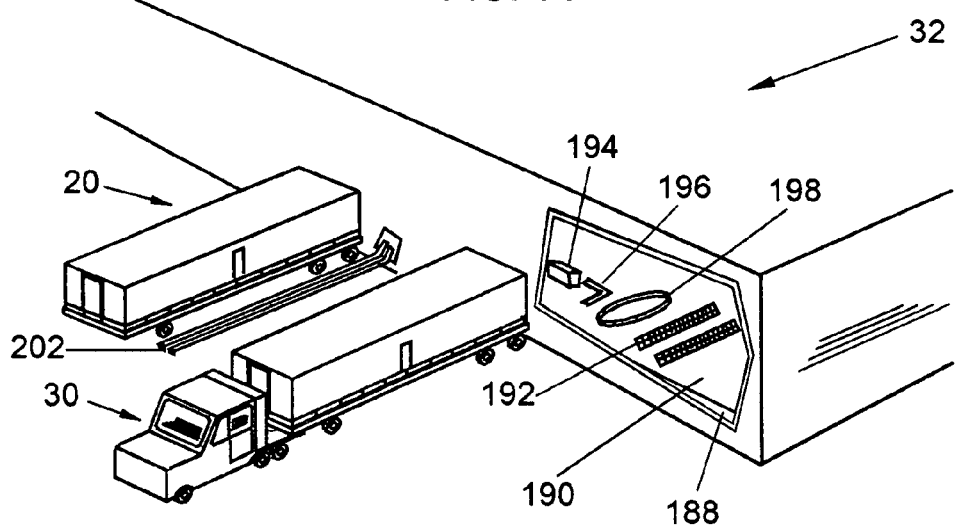
FIG. 14 is a perspective view of a passenger air terminal with containers parked at the gates.
Figure 15:
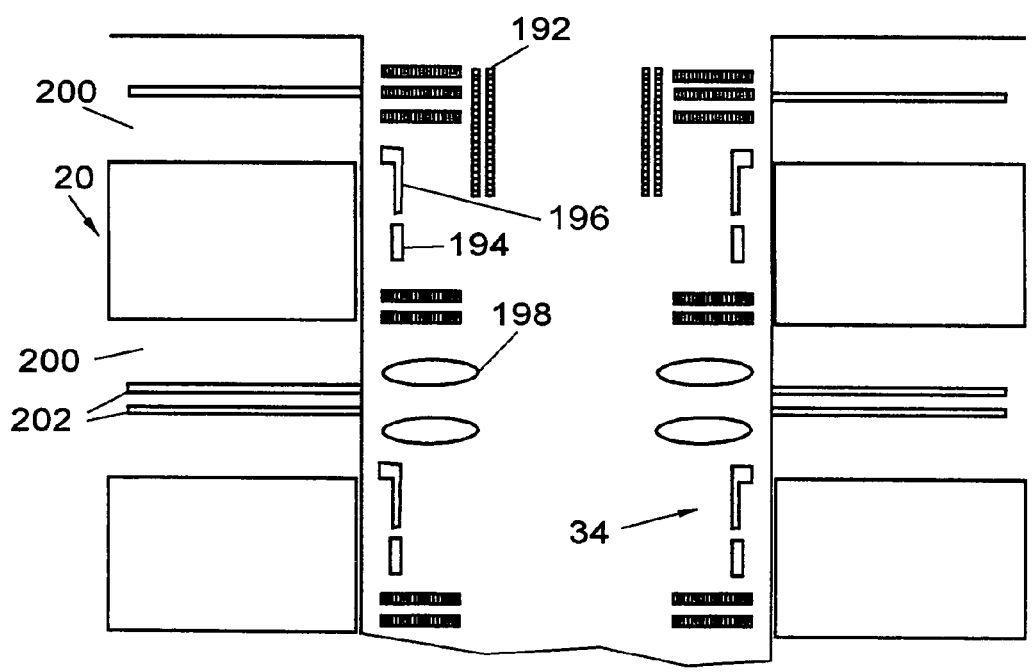
FIG. 15 is a top plan view of a passenger air terminal with containers parked outside the gates.
Figure 16:
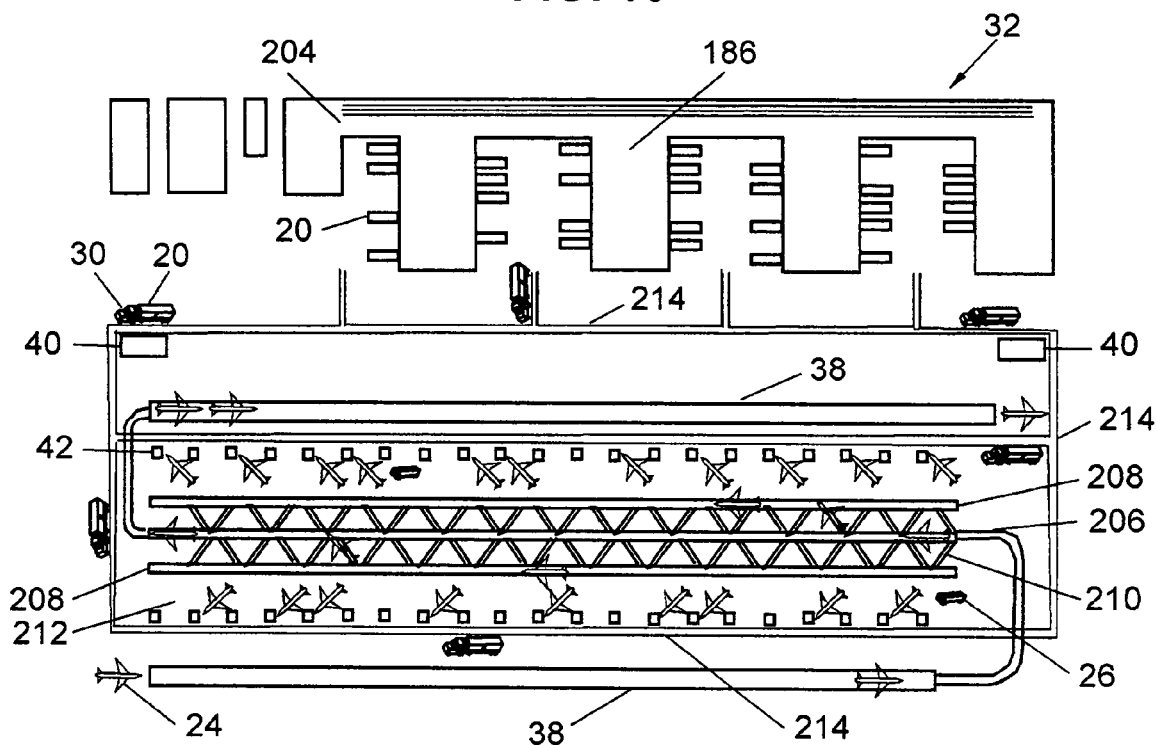
FIG. 16 is a top plan view of an airport complex with runways, terminals, and staging areas.

The present invention also relates to passenger air terminals (FIGS. 14, 15, 16). Terminals may be located within the airport complex or at remote locations outside the airport. The passenger terminal is comprised of parking garages, bus and train stations, a plurality of concourse buildings 186 designed to process passengers either originating or ending their air travel at the terminal, or changing flights at the airport. Passenger terminal buildings are comprised of a plurality of levels. In the two level building of the present invention, the lower level 188 includes service facilities as well as baggage transport conveyors. The upper level 190 includes a series of arrival and departure gates 34 along the sides of the building. Each gate includes a plurality of seats 192, check-in counters 194, and conveyors for baggage delivery 196 and baggage claim 198. The width of each gate provides room for parking the passenger container outside the building. It also provides space on both sides of the container 200 for loading and unloading baggage from baggage compartments 56 in the bottom level of the container. Conveyors 202 transport baggage from the container into the building and onto the baggage claim conveyor inside the gate area. Another conveyor from the check-in counter inside the gate area transports baggage from boarding passengers to the outside and to either side of the passenger container to be loaded into baggage compartments in the container. A central spine 204 or central core connects concourses to each other.

The present invention also relates to an airport complex (FIG. 16), which is comprised of a plurality of take-off and landing runways 38, facilities in staging areas 42 to load and unload passenger and cargo containers into and out of airplanes, facilities to refuel and service airplanes between landing and take-off, and weapons detection facilities 40 with apparatus to scan containers for weapons including explosives and radiological and bio-chemical agents. At modern commercial airports, take-off and landing runways are typically parallel to one another. The airplane staging area of the present invention is located longitudinally along the take-off and landing runways. The staging area is comprised of a longitudinal main taxiway 206 located between two parallel access taxiways 208. Each access taxiway passes a plurality of spurs 210 on one side, and staging stations 212 on the other side. Tractor trucks transporting passenger and cargo containers travel on roads 214 running parallel to the taxiways adjacent to parked airplanes. The roads lead to air terminals within the airport complex and from there to streets and highways outside the complex.

The system and method of the present invention integrates the air and ground transportation of passengers and cargo to operate as follows. Passengers travel to a remote air terminal or to the terminal at the airport. The terminal at the airport provides the usual amenities and services including parking garage, public transportation, ticketing, security, baggage check-in, baggage claim, and arrival and departure gates. Remote passenger air terminals located a distance outside the airport complex are similarly equipped. At the terminal, passengers either walk or use various means including moving sidewalks or closed-loop trains to move from the parking garage or public transportation stations to and from their respective gates. Departing passengers go through ticketing, baggage check-in, and security the usual way before proceeding to their designated departure gate and into their respective passenger containers. Passengers board the containers and take their seats the usual way. Checked-in baggage at each gate is automatically matched with its owner as passengers board the container.

After boarding is completed, container doors are closed. A tractor truck backs to the front of the flatbed trailer, hooks up with the flatbed trailer carrying the container and transports the container from the gate to a designated airplane staging area. Containers transported by rail from remote air terminals are taken off of flatbed railcars, placed on flatbed trailers, and transported to a designated airplane staging area. On the way to the airplane, the container is processed through a weapons detection facility to scan for weapons including explosives and radiological and bio-chemical agents. At the staging area, a lift vehicle approaches the rear of the flatbed trailer. The lift vehicle aligns its top flat surface with the top of the flatbed trailer and engages a power mechanism to move the container off of the flatbed trailer and onto the lift vehicle. The lift vehicle then disengages from the flatbed trailer and drives to the airplane. The lift vehicle raises the container and aligns the top of its flat surface with the guides on the floor of the airplane's hollow fuselage. The lift vehicle engages with the airplane's floor guides. The powered chain track mechanism moves the container off of the lift vehicle and into the airplane.

Containers are loaded into the hollow fuselage of the airplane one at a time. Passenger containers are loaded into the fuselage first, followed by cargo containers. Once inside, each container is securely locked into place and its utility connections are hooked up to the airplane's feed lines. The front door of the first passenger container connects with the door of the cockpit. Each passenger container following the first one locks in position with the container in front of it. Sealable interlocking doors between passenger containers permit passengers and flight crew to move between passenger containers. In case of emergency, the cockpit crew can unlock the cockpit door to gain access to passenger containers. When all containers are loaded into the airplane, the loading doors of the airplane are closed. When the airplane is ready to fly, it drives out of the staging area on its own power and moves from the access taxiway onto the main staging taxiway towards the starting point of the take-off runway. The airplane receives permission from air traffic control and takes off in the usual way.

The airplane flies from the departure airport to its destination airport in the usual way. In case of a mid-air mishap, containers are ejected out of the airplane and their parachutes are deployed so that they can descend safely to the ground. While in the air, flight attendants can serve food and beverages using traditional carts or use the overhead robot to deliver and retrieve food trays and beverages. After landing at the destination airport, the airplane taxis to the end of the runway and turns onto the main staging taxiway. The airplane staging area is located near the runways to minimize taxiing in order to reduce fuel consumption and runway crossovers, which are major expenses and causes of delays and accidents. The airplane continues moving forward on the main staging taxiway until it approaches its designated staging station, at which time it moves over onto the access taxiway and turns off at the designated staging station. The airplane drives to its station on its own power without needing to be towed by an aircraft tug. When the airplane parks at its staging station, service crews perform turnaround operations which are comprised of using lift vehicles to unload passenger and/or cargo containers from the airplane, refueling, inspecting, servicing, and then loading outgoing passenger and/or cargo containers into the airplane.

To unload a container from the airplane, a lift vehicle drives to the container insertion opening of the airplane, positions the vehicle, raises its flat surface and engages with the guides on the floor of the airplane's hollow fuselage. The powered chain track mechanism on the floor of the fuselage moves the container horizontally towards the rear of the airplane and out onto the lift vehicle. Tractor trucks with empty flatbed trailers approach the airplane that is being unloaded. The lift vehicle that has unloaded the airplane transfers a passenger or cargo container onto an empty flatbed trailer. Tractor trucks then transport their containers to one of the following destinations: another airplane for the next segment of the trip; a terminal at the airport; a remote air terminal located outside the airport; or to another final destination. At the terminal, the tractor truck backs the passenger container to a designated gate and disengages from the flatbed trailer. After the passenger container is parked at the gate, passengers disembark. Ground crew unloads passenger baggage from baggage compartments in the container. Baggage is conveyed to the baggage claim conveyor inside the gate area. Disembarking passengers pick up their baggage from the baggage claim conveyor as they get off the container. They take their baggage to ground transportation or to their next flight. Meanwhile, arriving passenger containers are cleaned and serviced, and food and beverage carts are replenished, preparing the container to board new passengers.

Similarly, cargo containers are unloaded from the airplane and placed on flatbed trailers. The trailers are transported to one of the following destinations: another airplane for the next segment of the trip; a cargo terminal at the airport; a remote cargo terminal located outside the airport; or to the recipient at the final destination. At the final destination, the cargo container is backed to a loading dock where its content is unloaded. The empty cargo container is transported to the next shipper where it is loaded and transported to the airport.

FIG. 17

Additional Embodiments

Figure 17:
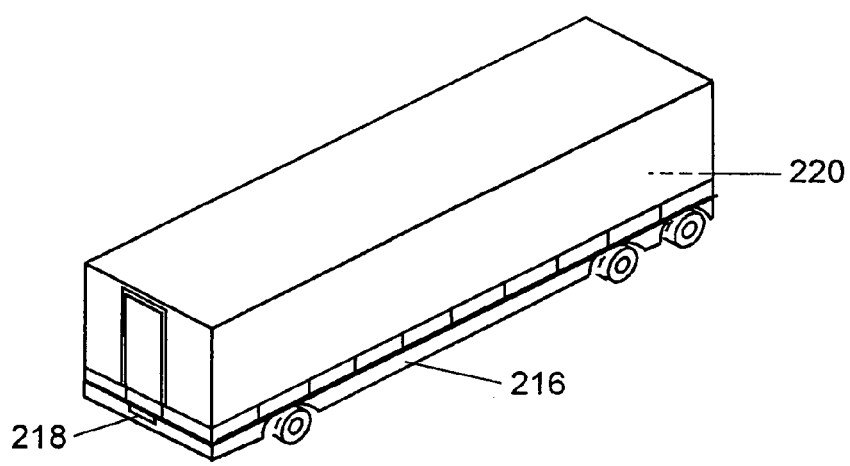
FIG. 17 is a perspective view of alternate embodiment of the invention showing a passenger container with wheels.

Additional embodiment is shown in FIG. 17, wherein the passenger and cargo container of the preferred embodiment is permanently mounted on chassis 216 with plurality of wheels. The wheeled chassis eliminates the need for flatbed trailers of preferred embodiment. Each container is equipped with towing apparatus in the front 218 and rear 220, enabling it to be transported individually or in tandem. Wheeled containers are transported by tractor truck of the preferred embodiment to a transport airplane of the preferred embodiment and loaded into the airplane's hollow fuselage. Similarly, wheeled containers are unloaded from the airplane and transported by tractor truck to the arrival gate or to another final destination.

FIGS. 18-19

Alternative Embodiments

Figure 18:
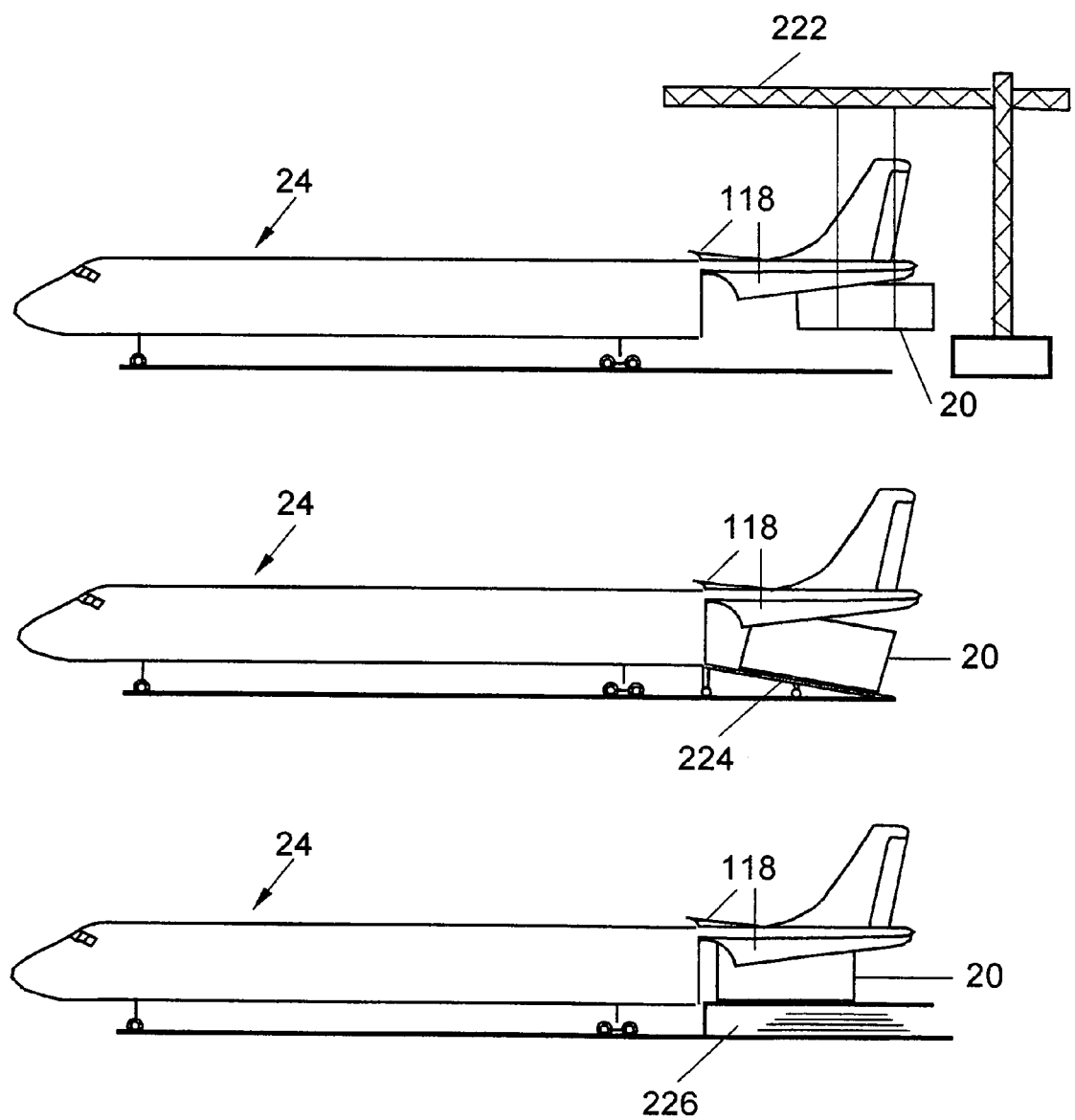
FIG. 18 are side elevational views of alternate embodiments of the invention showing different apparatus to load and unload the airplane.

There are different variations with regard to the apparatus to load and unload an airplane and different configurations to provide access to the insertion point of the hollow fuselage of an airplane to insert containers. FIG. 18 shows three alternative embodiments to loading and unloading containers. One alternative can be an overhead crane 222 that lifts the passenger or cargo container and inserts it into the fuselage of the airplane. Another alternative can be a portable ramp 224, moved to the container insertion opening of the fuselage. The portable ramp latches to the fuselage opening and provides the means for containers to be loaded into and unloaded from the fuselage. A further alternative embodiment can be a raised loading and unloading platform 226 at the same height as the opening to the fuselage. The airplane approaches the platform and positions its fuselage insertion point against the platform and provides the means for containers to be loaded into and unloaded from the fuselage.

Figure 19:
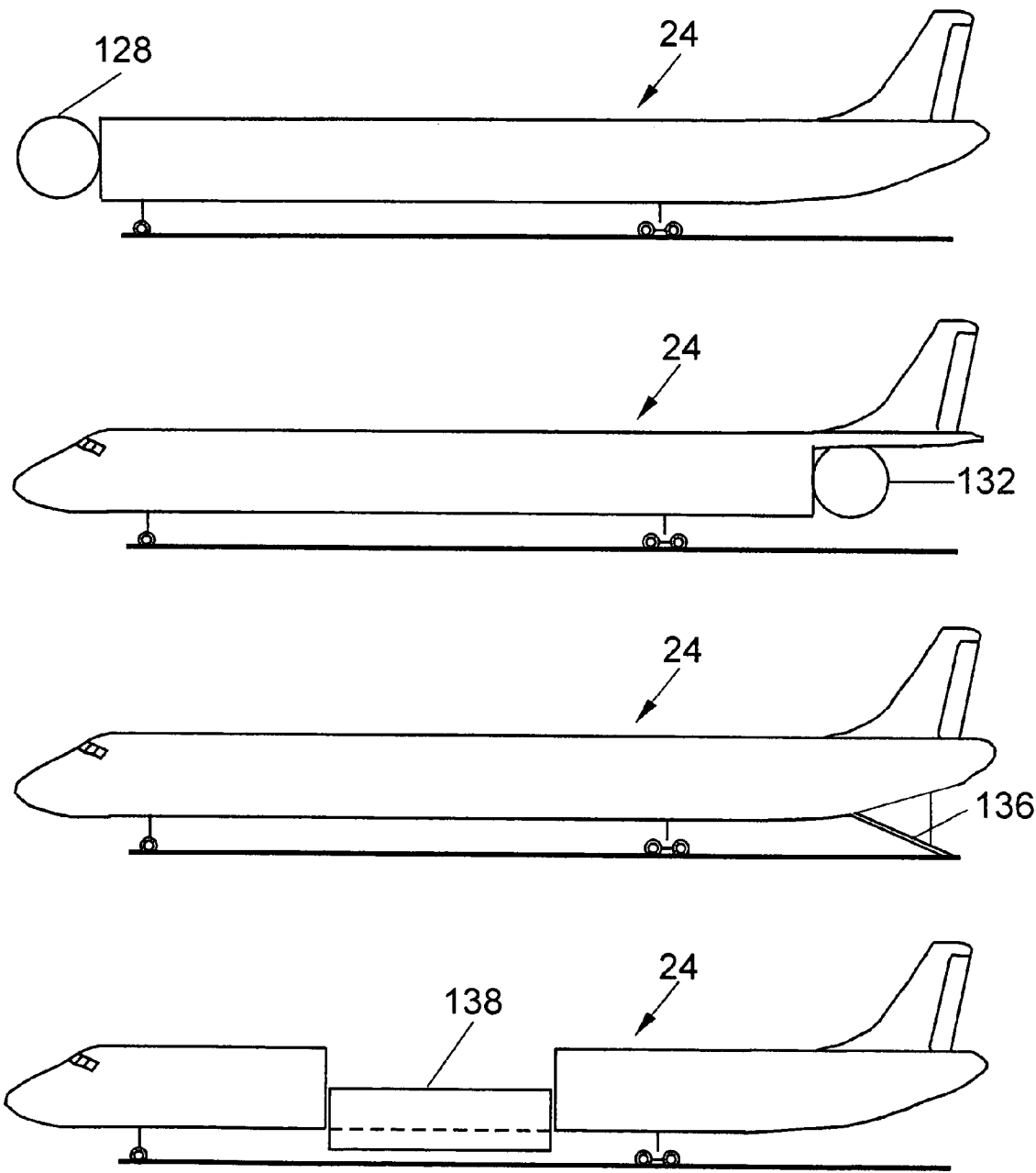
FIG. 19 are side elevational views of alternate embodiments of the invention showing different airplane configurations for loading and unloading containers.

FIG. 19 shows four alternative embodiments to accessing the airplane's container insertion opening. One alternative is that the hinged front section of the airplane containing the nose cone swings open 128 up or to the side. Another alternative is that the hinged rear section of the airplane swings open 132 up or to the side. A further alternative is that the hinged bottom section at the rear of the airplane opens like a door with the unhinged end lowering to the ground like a ramp 136. Another alternative is that hinged doors on the top sides of the fuselage swing open 138 to expose an insertion point at the top.

ADVANTAGES, CONCLUSIONS, RAMIFICATIONS, AND SCOPE

From the description above, a number of advantages of the present system and method for integrating air and ground transportation of passengers and cargo become evident:

(a) An airplane with a hollow fuselage maximizes around-the-clock utilization of the airplane by providing the flexibility to transport at different times an optimum combination of passenger and/or cargo containers as well as containers from multiple air carriers.

(b) The use of passenger and cargo containers enables airplanes to be loaded and unloaded in less time than conventional methods, thus maximizing airplane utilization by reducing the length of time they sit idle at the gate.

(c) The use of remote passenger air terminals at strategic locations outside the airport enables passengers to start their trip from the most convenient air terminal instead of having to drive all the way to the airport, thus reducing passenger and automobile congestion at the airport, increasing the capacity of the airport and extending its useful life.

(d) The use of cargo containers enables shippers to load their cargo directly into the container at the point of origin and similarly enables recipients to unload their cargo at the final destination, thus eliminating costly multiple handling of the cargo and damage and pilferage.

(e) Loading and unloading containers into and out of airplanes in a staging area near take-off and landing runways reduces turnaround time, minimizes taxi time, reduces fuel consumption, and eliminates related safety issues as well as the need for aircraft tugs to tow the airplane to and from the gate.

(f) Passenger containers of the present invention increase the capacity of existing airports because they require a fraction of the space of airplanes parking at gates and terminals.

(g) Security is improved as a result of separating passenger containers from the cockpit, restricting access to the cockpit, ensuring that baggage travels with its owner in the same container, and scanning containers for weapons including explosives and radiological and bio-chemical agents before they are loaded into the airplane.

(h) Passenger safety is improved by providing a parachute system for containers to safely descend to the ground in case of a mid-air mishap.

(i) Transportation of military and emergency personnel and materiel by air is improved as a result of added capacity and flexibility of civilian airplanes.

(j) The entire air and ground transportation system is streamlined by integrating the travel cycle from the point of origin to the final destination thus reducing the overall travel time from the point of origin to the final destination.

(k) Baggage handling costs are reduced and lost baggage issues are almost eliminated.

(l) The workload of flight attendants is reduced by using the overhead robotic mechanism to deliver and retrieve food trays and beverages during flight.

Accordingly, the reader will see that the system and method for integrating air and ground transportation of passengers and cargo as described by this invention can be used to increase the efficiency and capacity of the air transportation industry, lower operating costs, improve passenger safety and security, and extend the useful life of existing airports. Additionally, using remote air terminals enables new airport runways to be built farther from population centers. The system allows aircraft and passenger container technologies to improve independent of one another. Furthermore, the system and method for integrated air and ground transportation has additional advantages in that:

it permits the mass production of passenger and cargo containers on the level of buses and shipping containers respectively, thus helping to reduce manufacturing and maintenance costs and increase the flexibility to develop different passenger cabin interiors for different purposes;

it simplifies aircraft manufacturing by enabling different airplane designs to be based on how many containers they can carry and how fast and how far they can fly;

it allows greater flexibility for future innovations in aircraft design and performance, based on changes in passenger and cargo transportation requirements;

it streamlines aircraft design by eliminating passenger windows that decrease aerodynamic and fuel efficiency, and are costly to build into the airplane;

it allows passengers to claim their baggage as soon as they disembark at the gate, thus reducing lost baggage incidents and minimizing the need for costly baggage handling and tracking systems;

it permits airports to handle super jumbo airplanes without the need for building or remodeling air terminals;

it permits existing airports to increase their gate capacity by converting terminals, concourses, and gates from processing airplanes to processing passenger containers;

it permits airports to add new airplane staging areas near their existing runways without needing to acquire significant and costly land;

it minimizes congestion and security concerns at airports by reducing heavy concentration of passengers and employees.

While the description above contains many specifications, these should not be construed as limiting the scope of the invention but as merely providing illustrations of some of the presently preferred embodiments of this invention. Additionally, many modifications may be made to adapt a particular situation or process to the teachings of the invention without departing from its essential scope. For example, passenger and cargo containers can have other shapes, such as cylindrical or elliptical; the interior of passenger containers may have other configurations, such as luxury-class, private cabins, or military accommodations; passenger and cargo containers can have other mobile features, such as including a chassis with wheels so they can be towed, or a chassis with wheels and a motor so they can be driven; passenger and cargo containers can be transported by rail to and from the airport; the airplane can have other shapes, such as elliptical, wide-body, or blended-wing-body; passenger containers can have windows and the airplane can also have windows corresponding to windows on passenger containers; passenger containers can have flat-panel video displays with the shape and functionality of conventional airplane windows; the point of insertion of passenger and cargo containers into the airplane's fuselage can be at other sections of the airplane, the nose section can swing open to one side or flip up, the tail section can swing open to one side or flip up, a side door can flip up, top doors can swing open, or one end of a hinged rear door can lower to the ground like a ramp; passenger and cargo containers can be loaded into the airplane by other methods, such as a crane, a side loader, a portable ramp, a raised platform for the airplane to park next to; the air terminal building can have other configurations, such as multi-story building with gates and passenger container parking spaces on more than one level, or it can be an underground building.

Based on the aforementioned detailed description, different elements and aspects of the invention including function, operation, usage, form, dimension, shape, and material should be readily apparent to those skilled in the art. Therefore, such variations to those described above are considered part of the scope of this invention. It is intended that the scope of the invention not be limited by the embodiments described and illustrated, but that the invention will include any embodiments that fall within the appended claims and their legal equivalents.

I claim:

1. A method for transporting passengers and cargo by air and ground, the method comprising the steps of:

moving a portable passenger compartment including passengers and passengers' baggage residing therein from a first passenger terminal distant from a first airfield to a second passenger terminal distant from a second airfield, wherein said portable passenger compartment is of universal size and configuration, its structure and exterior fabricated of rigid materials, its dimensions allowing it to be transported on streets and highways, containing a plurality of seats, video displays, accommodations that include storage containers and means for storing, preparing and delivering food and beverages, a plurality of bathrooms, and utilities including electricity, ventilation, air conditioning, lighting, water, audio, video, and computer feeds, wherein said passenger terminal comprises a building complex with a plurality of levels providing passenger processing functions including ticketing, check-in, baggage check-in, baggage claim, and baggage conveyance; and moving a portable cargo compartment including cargo residing therein from a first cargo facility distant from the first airfield to a second cargo facility distant from the second airfield, wherein said cargo compartment is of universal size and configuration, its structure and exterior fabricated of rigid materials, its dimensions allowing it to be transported on streets and highways, capable of carrying cargo of a predetermined cubic volume and weight, wherein said cargo facility comprises a building complex with a plurality of levels and plurality of doors providing access to said portable cargo compartment;

wherein the step of moving a portable passenger compartment comprises a step of transporting the portable passenger compartment in an aircraft from the first airfield to the second airfield, said aircraft comprises a basic structure containing the nose section, cockpit, wings, engines, tail section, and a hollow fuselage located between said cockpit and tail section, a plurality of aircraft sizes holding a plurality of said portable passenger compartments, said hollow fuselage comprises an internal rigid structure conforming to the shape of said portable passenger compartment, and apparatus enabling said portable passenger compartment to be loaded into, unloaded from, and securely attached to said aircraft;

wherein the step of moving a portable cargo compartment comprises a step of transporting the portable cargo compartment in the same aircraft from the first airfield to the second airfield concurrently with the portable passenger compartment; and wherein the first airfield and the second airfield are located in distant geographical areas, said first and second airfield comprises a plurality of take-off and landing runways, taxiways, a plurality of aircraft staging areas to load and unload said portable passenger compartments and said portable cargo compartments into and out of said aircraft, to refuel and service the aircraft during turnaround, and a plurality of said passenger terminals.

2. The method of claim 1, wherein the step of moving a portable passenger compartment comprises a step of retaining the passengers within the portable passenger compartment absent egress thereof during movement of the portable passenger compartment from the first passenger terminal to the second passenger terminal.

3. The method of claim 1, wherein the step of moving a portable passenger compartment comprises a step of transporting the portable passenger compartment by ground-based transport from the first passenger terminal to the first airfield.

4. The method of claim 3, wherein the step of transporting the portable passenger compartment by ground-based transport comprises the steps of (i) loading the portable passenger compartment at the first passenger terminal onto a conveying device adapted to receive the portable passenger compartment and (ii) conveying the portable passenger compartment via the conveying device from the first passenger terminal to the first airfield.

5. The method of claim 3, wherein the step of transporting the portable passenger compartment by ground-based transport comprises conveying the portable passenger compartment mounted onto a trailer from the first passenger terminal to the first airfield, wherein said trailer comprises a flatbed top surface equal to the shape and dimensions of the bottom of said portable passenger compartment, mounted on a chassis with plurality of wheels, with longitudinal rigid guards on the top right-hand and left-hand sides of said trailer, an apparatus on top surface of said trailer to facilitate horizontal forward and reverse movement of said portable passenger compartment on top of said trailer, a locking apparatus to securely attach said portable compartment to said trailer, a towing mechanism on the front and on the rear of said trailer.

6. The method of claim 5, wherein the step of transporting the portable passenger compartment mounted onto the trailer by ground-based transport comprises a tractor truck adapted to moving the trailer with the portable passenger compartment from the first passenger terminal to the first airfield, wherein said tractor truck comprises a towing mechanism on the rear to connect with said trailer and a self-powered means of providing utilities including electricity, ventilation, air conditioning, water, audio video and computer feeds and other amenities to the portable passenger compartment.

7. The method of claim 1, wherein the step of moving a portable passenger compartment by ground-based transport from the second airfield to the second passenger terminal comprises conveying the portable passenger compartment mounted onto a trailer from the second airfield to the second passenger terminal, wherein said trailer comprises a flatbed top surface equal to the shape and dimensions of the bottom of said portable passenger compartment, mounted on a chassis with plurality of wheels, with longitudinal rigid guards on the top right-hand and left-hand sides of said trailer, an apparatus on top surface of said trailer to facilitate horizontal forward and reverse movement of said portable passenger compartment on top of said trailer, a locking apparatus to securely attach said portable compartment to said trailer, and a towing mechanism on the front and on the rear of said trailer.

8. The method of claim 7, wherein the step of transporting the portable passenger compartment mounted onto the trailer by ground-based transport comprises a tractor truck adapted to moving the trailer and portable passenger compartment from the second airfield to the second passenger terminal, wherein said tractor truck comprises a towing mechanism on the rear to connect with said trailer and a self-powered means of providing utilities including electricity, ventilation, air conditioning, water, audio, video and computer feeds and other amenities to the portable passenger compartment.

9. The method of claim 7, wherein the step of transporting the portable passenger compartment by ground-based transport comprises the steps of (i) loading the portable passenger compartment at the second airfield onto a conveying device adapted to receive the portable passenger compartment and (ii) conveying the portable passenger compartment via the conveying device from the second airfield to the second passenger terminal.

10. The method of claim 1, wherein the first passenger terminal and the first airfield are located in substantially the same geographical area part of the same airport complex wherein said passenger terminal comprises a building complex with a plurality of levels and a plurality of arrival and departure gates, providing passenger processing functions including ticketing, check-in, baggage check-in, baggage claim, various forms of people movers, and baggage conveyance, wherein said airfield comprises a plurality of take-off and landing runways, taxiways, a plurality of aircraft staging areas to load and unload said portable passenger compartments and portable cargo compartments into and out of said aircraft and refuel and service the aircraft during turnaround.

11. The method of claim 1, wherein the second passenger terminal and the second airfield are located in substantially the same geographical area part of the same airport complex wherein said passenger terminal comprises a building complex with a plurality of levels and a plurality of arrival and departure gates, providing passenger processing functions including ticketing, check-in, baggage check-in, baggage claim, various forms of people movers, and baggage conveyance, wherein said airfield comprises a plurality of take-off and landing runways, taxiways, a plurality of aircraft staging areas to load and unload said portable passenger compartments and portable cargo compartments into and out of said aircraft and refuel and service the aircraft during turnaround.

12. The method of claim 1, wherein the steps of processing cargo at the first cargo facility comprises a building complex with a plurality of levels with plurality of doors to provide access to cargo compartment, wherein the steps of processing the air freight cargo comprises the steps of (i) loading cargo into the cargo compartment and (ii) unloading cargo out of the cargo compartment.

13. The method of claim 1, wherein the steps of processing air freight cargo at the second facility comprises the steps of (i) unloading cargo out of the portable cargo compartment and (ii) loading cargo into the portable cargo compartment, wherein said second cargo facility comprises a building complex with a plurality of levels with plurality of doors to provide access to cargo compartment.

14. A method for transporting passengers and cargo by air and ground, the method comprising the steps of:

carrying by ground-based transport from a passenger origin site to an airfield a portable passenger compartment adapted for transportation by air and ground, wherein the portable passenger compartment includes passengers residing therein, and wherein the passenger origin site is distant from the airfield wherein said portable passenger compartment is of universal size and configuration, its structure and exterior fabricated of rigid materials, its dimensions allowing it to be transported on streets and highways, containing a plurality of seats, video displays, accommodations that include storage containers and means for storing, preparing and delivering food and beverages, a plurality of bathrooms, and utilities including electricity, ventilation, air conditioning, lighting, water, audio, video, and computer feeds;

moving by ground-based transport from a cargo origin site to an airfield cargo present in a portable cargo compartment adapted for transportation by air and ground, wherein the cargo origin site is distant from the airfield wherein said cargo compartment is of universal size and configuration, its structure and exterior fabricated of rigid materials, its dimensions allowing it to be transported on streets and highways, capable of carrying cargo of a predetermined cubic volume and weight;

loading at an airfield the portable passenger compartment and the portable cargo compartment into an aircraft cooperatively configured to receive and concurrently transport the portable passenger compartment and the portable cargo compartment said aircraft comprises a basic structure containing the nose section, cockpit, wings, engines, tail section, and a hollow fuselage located between said cockpit and tail section, a plurality of aircraft sizes holding a plurality of said portable passenger compartments, said hollow fuselage comprises an internal rigid structure conforming to the shape of said portable passenger compartment, and apparatus enabling said portable passenger compartment to be loaded into, unloaded from, and securely attached to said aircraft; and transporting the portable passenger compartment and the portable cargo compartment concurrently by air in the aircraft from a first airfield to a second airfield;

unloading at a second airfield the portable passenger compartment and the portable cargo compartment from the aircraft onto a trailer;

carrying by ground-based transport from a second airfield to a destination passenger terminal a portable passenger compartment, wherein the portable passenger compartment includes passengers residing therein, and wherein the passenger destination site is distant from the airfield;

moving by ground-based transport from a second airfield to a destination cargo facility cargo present in a portable cargo compartment adapted for transportation by air and ground, wherein the cargo destination site is distant from the airfield.

15. The method of claim 14, wherein the steps of carrying, loading, transporting, unloading, and carrying from a passenger origin site to a passenger destination site are performed absent a passenger exiting the portable passenger compartment.

16. The method of claim 14, wherein the steps of moving, loading, transporting, unloading, and moving are performed absent any cargo being removed from the portable cargo compartment.

17. The method of claim 14, wherein the passenger origin site and the cargo origin site comprise different locations said locations at different parts of the metropolitan area served by said airfield.

18. The method of claim 14, wherein prior to the step of carrying the portable passenger compartment by ground-based transport from a passenger origin site to a first airfield, the method further comprises the steps of (i) checking in passengers' baggage, (ii) conveying passengers' baggage to the baggage section of the portable passenger compartment, (iii) loading passengers' baggage into the baggage section of the portable passenger compartment, and (iv) embarking the passengers into the passenger section of the portable passenger compartment.

19. The method of claim 14, wherein the step of carrying the portable passenger compartment comprises a step of providing video displays, accommodations that include storage containers and means for storing, preparing and delivering food and beverages, a plurality of bathrooms, and utilities including electricity, ventilation, air conditioning, lighting, water, audio, video, and computer feeds.

20. The method of claim 14, wherein the step of loading the portable passenger compartment and the portable cargo compartment into an aircraft comprises positioning the loading apparatus on the portable passenger compartment and the portable cargo compartment in contact with the loading apparatus within the aircraft for cooperatively enabling movement of both the portable passenger compartment and portable cargo compartment into and out of the aircraft.

21. The method of claim 14, wherein the airfield comprises a first airfield and the step of transporting comprises moving the portable passenger compartment and the portable cargo compartment concurrently by air in the aircraft to a second airfield distant from the first airfield, and wherein the method further comprises the steps of:

carrying by ground-based transport the portable passenger compartment from the second airfield to a passenger destination site distant from the second airfield; and moving by ground-based transport the portable cargo compartment from the second airfield to a cargo destination site distant from the second airfield.

22. The method of claim 14, wherein the portable passenger compartment comprises a first portable passenger compartment and the passenger origin site comprises a first passenger origin site, and wherein the method further comprises the steps of:

carrying by ground-based transport from a second passenger origin site to the airfield a second portable passenger compartment adapted for transportation by air and ground, wherein the second portable passenger compartment includes passengers residing therein, and wherein the second passenger origin site is distant from the airfield and distant from the first passenger origin site;

loading at the airfield the second portable passenger compartment into the aircraft with the first portable passenger compartment and the portable cargo compartment; and transporting the second portable passenger compartment concurrently by air in the aircraft with the first passenger compartment and the portable cargo compartment.

23. The method of claim 22, wherein the airfield is a first airfield and the method further comprises the steps of:

unloading at a second airfield from the aircraft the first portable passenger compartment and the second portable passenger compartment;

carrying the first portable passenger compartment by ground-based transport from the second airfield to a first passenger destination site distant from the second airfield; and carrying the second portable passenger compartment by ground-based transport from the second airfield to a second passenger destination site distant from the second airfield and distant from the first passenger destination site at a different part of the metropolitan area served by the second airfield.

24. A method for transporting passengers and cargo by air and ground, said method comprising the steps of:

processing passengers at a first passenger terminal located distant from a first airfield, said passenger terminal comprises a building complex with a plurality of levels providing functions including ticketing, check-in, baggage check-in, baggage claim, various forms of people movers, and baggage conveyance;

embarking passengers into a portable passenger compartment at a first passenger terminal located distant from a first airfield wherein said portable passenger compartment is of universal size and configuration, its structure and exterior fabricated of rigid materials, its dimensions allowing it to be transported on streets and highways, containing a plurality of seats, video displays, accommodations that include storage containers and means for storing, preparing and delivering food and beverages, using a robot to deliver food and beverages, a plurality of bathrooms, and utilities including electricity, ventilation, air conditioning, lighting, water, audio, video, and computer feeds, and apparatus enabling said portable passenger compartment to be attached to ground transport means and to the aircraft;

processing and loading air freight cargo into portable cargo compartment at a first cargo facility located distant from said first airfield said cargo facility comprises a building complex with a plurality of levels and plurality of doors providing access to said portable cargo compartment;

carrying portable passenger compartment from first passenger terminal to first airfield said portable passenger compartment mounted onto a trailer, wherein said trailer comprises a flatbed top surface equal to shape and dimensions of the bottom of said portable passenger compartment, mounted on a chassis with plurality of wheels, with longitudinal rigid guards on the top right-hand and left-hand sides of said trailer, an apparatus on top surface of said trailer to facilitate horizontal forward and reverse movement of said portable passenger compartment on top of said trailer, a locking apparatus to securely attach said portable passenger compartment to said trailer, a towing mechanism on the front and on the rear of said trailer;

moving portable cargo compartment mounted onto a trailer from first cargo facility to first airfield;

loading portable passenger compartment and portable cargo compartment into aircraft said aircraft comprises a basic structure containing the nose section, cockpit, wings, engines, tail section, and a hollow fuselage located between said cockpit and tail section, a plurality of aircraft sizes holding a plurality of said portable passenger compartments, said hollow fuselage comprises an internal rigid structure conforming to the shape of said portable passenger compartment, and apparatus enabling said portable passenger compartment to be loaded into, unloaded from, and securely attached to said aircraft, safety parachute securely attached to top of said portable passenger compartment;

transporting portable passenger compartment and portable cargo compartment concurrently from a first airfield to a second airfield;

unloading portable passenger compartment and portable cargo compartment from aircraft at second airfield and mounting onto trailer;

carrying portable passenger compartment from a second airfield to a second passenger terminal;

moving portable cargo compartment from a second airfield to a second cargo facility.

25. The method of claim 24, wherein the step of checking-in arriving passengers at first passenger terminal comprises the steps of (i) obtaining boarding permit, (ii) checking in baggage, (iii) conveying baggage to the portable passenger compartment, and (iv) loading passengers' baggage into the baggage section of the portable passenger compartment.

26. The method of claim 24, wherein the step of loading air freight into the portable cargo compartment comprises the step of placing cargo inside the portable cargo compartment wherein said cargo compartment is of universal size and configuration, its structure and exterior fabricated of rigid materials, its dimensions allowing it to be transported on streets and highways, capable of carrying cargo of a predetermined cubic volume and weight, and apparatus enabling said portable passenger compartment to be securely attached to ground transport means and to the aircraft.

27. The method of claim 24, wherein the step of embarking passengers into the portable passenger compartment comprises the step of seating passengers inside the portable passenger compartment, wherein said portable passenger compartment is of universal size and configuration, its structure and exterior fabricated of rigid materials, its dimensions allowing it to be transported on streets and highways, containing a plurality of seats, video displays, accommodations that include storage containers and means for storing, preparing and delivering food and beverages, a robot to deliver food and beverages, a plurality of bathrooms, and utilities including electricity, ventilation, air conditioning, lighting, water, audio, video, and computer feeds, and apparatus enabling said portable passenger compartment to be attached to ground transport means and to the aircraft.

28. The method of claim 24, wherein the step of moving portable passenger compartment and portable cargo compartment comprises the step of mounting onto a trailer, wherein said trailer comprises a flatbed, top surface equal to shape and dimensions of the bottom of said portable passenger compartment, mounted on a chassis with plurality of wheels, with longitudinal rigid guards on the top right-hand and left-hand sides of said trailer, an apparatus on top surface of said trailer to facilitate horizontal forward and reverse movement of said portable passenger compartment on top of said trailer, a locking apparatus to securely attach said portable compartment to said trailer, a towing mechanism on the front and on the rear of said trailer.

29. The method of claim 24, wherein the step of checking the portable passenger compartment and portable cargo compartment for explosives and weapons comprises the step of passing said compartments through scanning and detection devices.

30. The method of claim 24, wherein the step of transporting portable passenger compartment and portable cargo compartment by aircraft from first airfield to second airfield comprises placing said compartments inside the aircraft wherein said aircraft comprises a basic structure containing the nose section, cockpit, wings, engines, tail section, and a hollow fuselage located between said cockpit and tail section, a plurality of aircraft sizes holding a plurality of said portable passenger compartments, said hollow fuselage comprises an internal rigid structure conforming to the shape of said portable passenger compartment, and apparatus enabling said portable passenger compartment to be loaded into, unloaded from, and securely attached to said aircraft.

31. The method of claim 24, wherein the step of loading and unloading portable passenger compartment and portable cargo compartment into and out of aircraft comprises the step of positioning said compartment to engage with the aircraft's powered transfer apparatus to move said compartment into and out of the hollow fuselage.

32. The method of claim 24, wherein the step of transporting portable passenger compartment and portable cargo compartment by aircraft from first airfield to second airfield comprises the step of loading and unloading said compartments in an aircraft staging area near take-off and landing runways, wherein said first and second airfield comprises a plurality of take-off and landing runways, taxiways, a plurality of aircraft staging areas to load and unload said portable passenger compartments and portable cargo compartments into and out of said aircraft and to refuel and service the aircraft during turnaround, and a plurality of said passenger terminals.

* * * * *